(12) United States Patent
Zhang et al.

(10) Patent No.: US 11,781,915 B2
(45) Date of Patent: Oct. 10, 2023

(54) COLOR WHEEL PHASE DETECTION METHOD AND SYSTEM, AND PROJECTION DEVICE

(71) Applicant: APPOTRONICS CORPORATION LIMITED, Shenzhen (CN)

(72) Inventors: Zhengde Zhang, Shenzhen (CN); Qiang Lv, Shenzhen (CN); Le Pan, Shenzhen (CN); Yi Li, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 767 days.

(21) Appl. No.: 16/622,512

(22) PCT Filed: Sep. 26, 2017

(86) PCT No.: PCT/CN2017/103438
§ 371 (c)(1),
(2) Date: Mar. 4, 2021

(87) PCT Pub. No.: WO2018/233115
PCT Pub. Date: Dec. 27, 2018

(65) Prior Publication Data
US 2022/0412807 A1   Dec. 29, 2022

(30) Foreign Application Priority Data

Jun. 22, 2017 (CN) .......................... 201710481232.7

(51) Int. Cl.
*G01J 9/00* (2006.01)
(52) U.S. Cl.
CPC ....................... *G01J 9/00* (2013.01)
(58) Field of Classification Search
CPC ......... G01J 9/00; G03B 33/08; G03B 21/206; G02B 26/008; H04N 9/3114; H04N 9/3194
See application file for complete search history.

(56) References Cited

U.S. PATENT DOCUMENTS

| | | | |
|---|---|---|---|
| 6,738,104 B2 * | 5/2004 | Marshall | H04N 9/3114 348/270 |
| 10,900,815 B2 * | 1/2021 | Chang | G03B 21/204 |
| 2001/0043288 A1 | 11/2001 | Smith | |

FOREIGN PATENT DOCUMENTS

| CN | 1655625 A | 8/2005 |
|---|---|---|
| CN | 101232624 A | 7/2008 |

(Continued)

OTHER PUBLICATIONS

International Search Report for International Application No. PCT/CN2017/103438, filed Mar. 14, 2018.

(Continued)

*Primary Examiner* — Seung C Sohn
(74) *Attorney, Agent, or Firm* — MARSHALL, GERSTEIN & BORUN LLP; Michael P. Furmanek

(57) ABSTRACT

A color wheel phase detection method and system, and a projection device. The phase detection system comprises a color wheel (1), a color wheel motor (2) that drives the color wheel (1) to rotate, and a control circuit (3); the color wheel motor (2) is a three-phase motor, and the control circuit (3) comprises a three-phase driving circuit (31) for driving the color wheel motor (2) to operate. The phase detection system further comprises a phase detection device (4) for detecting the three-phase driving circuit (31); when detecting a preset phase, the phase detection device (4) sends a pulse signal to the control circuit (3) to implement color wheel phase detection. Therefore, the effects of low costs, high accuracy, and high reliability are achieved.

18 Claims, 2 Drawing Sheets

(56) References Cited

FOREIGN PATENT DOCUMENTS

| | | | |
|---|---|---|---|
| CN | 101366275 | A | 2/2009 |
| CN | 101858757 | A | 10/2010 |
| CN | 102809664 | A | 12/2012 |
| CN | 103728824 | A | 4/2014 |
| CN | 104730821 | A | 6/2015 |
| KR | 20120026761 | A | 3/2012 |

OTHER PUBLICATIONS

First Office Action for Application No. CN 201710481232.7 issued by the State Intellectual Property Office of People's Republic of China, dated Nov. 12, 2019.

* cited by examiner

US 11,781,915 B2

COLOR WHEEL PHASE DETECTION METHOD AND SYSTEM, AND PROJECTION DEVICE

CROSS-REFERENCE TO RELATED APPLICATIONS

This is the United States national phase of International Patent Application No. PCT/CN2017/103438, filed Sep. 26, 2017, which claims priority to Chinese Patent Application No. CN 201710481232.7, filed Jun. 22, 2017, the entire contents of each of which hereby being incorporated herein by reference.

TECHNICAL FIELD

The present disclosure relates to the field of optics, and more particularly, to a color wheel phase detection method and system, and a projection device.

BACKGROUND

At present, laser projection technology has developed rapidly and has been widely used. Currently, a single-chip DLP projector uses one type of excitation light for excitation, so as to obtain different types of excited light, and outputs an image of different colors through a DMD so as to be restored into a real image.

A color wheel, as a vital component, affects performance of a projection device. In operation, a rotation speed and a phase of the color wheel need to be synchronized with the image, and a usual synchronization manner of the color wheel is to stick a piece of black tape on a motor of the color wheel and detect a position of the black tape on the rotating color wheel through a photoelectric detection device, so as to achieve detection of the rotation speed and the phase of the color wheel. Such a manner has two disadvantages. Firstly, if the motor of the color wheel has run for a long time, it is easy for the black tape on the motor to fall off, which results in asynchronization of the projection image, a phenomenon of blurred screen, and even impossibility of starting. Secondly, the position of the black tape needs to be aligned with a color section on the color wheel, and it is difficult to achieve accuracy during a production process.

Therefore, there is a need to provide a new color wheel phase detection system, a color wheel phase detection method, or a projection device to solve the above problems.

GENERAL DESCRIPTION

One of the technical problems mainly solved by the present disclosure is to provide a color wheel phase detection method, a color wheel phase detection system or a projection device, which are not only simple and effective, but also has low cost, and provide good user experience.

One of technical solutions adopted by the present disclosure is to provide a color wheel phase detection system, including a color wheel; a motor of the color wheel being a three-phase motor and configured to drive the color wheel to rotate; a control circuit comprising a three-phase driving circuit for controlling operation of the motor of the color wheel; and a phase detection device for detecting the three-phase driving circuit in such a manner that the phase detection device sends a pulse signal to the control circuit when detecting a preset phase corresponding to a preset starting position of the color wheel, so as to achieve detection of a phase of the color wheel.

In one embodiment, the phase detection device comprises an acquisition module for acquiring the phase of the three-phase driving circuit and a control module connected to the acquisition module, wherein the control module is configured to control the acquisition module, receive and record an acquisition result of the acquisition module.

In one embodiment, the acquisition module is an ADC acquisition module.

In one embodiment, the control module is an MCU module.

In one embodiment, the three-phase driving circuit comprises an A-phase power, a B-phase power, and a C-phase power, and the ADC acquisition module is configured to detect voltages of the A-phase power, the B-phase power, and the C-phase power simultaneously.

Preferably, the preset phase is a phase in which the voltage of the A-phase power is 0V, the voltage of the B-phase power is 0V, and the C-phase power is at a high level.

In one embodiment, the control circuit further comprises an image processing circuit which is configured to receive the pulse signal sent by the phase detection device and control the three-phase driving circuit according to the pulse signal.

Another technical solution adopted by the present disclosure is to a projection device including the color wheel phase detection system as described above.

Another technical solution adopted by the present disclosure is to provide a method of detecting a phase of a color wheel using the color wheel phase detection system as described above, wherein the color wheel has a preset starting position, and the color wheel phase detection method includes following steps:

detecting, by a phase detection device, a phase of a three-phase driving circuit at various moments, and determining whether the phase is a preset phase, the preset phase corresponding to the preset starting position of the color wheel; and sending, by the phase detection device, a pulse signal when the phase detection device detects that the phase of the three-phase driving circuit is the preset phase.

In one embodiment, said detecting, by the phase detection device, the phase of the three-phase driving circuit comprises steps of:

acquiring, by an ADC module, a voltage MA of an A-phase power, a voltage MB of a B-phase power, and a voltage MC of a C-phase power; and determining phases of the three phase powers at a current moment according to the voltage MA of the A-phase power, the voltage MB of the B-phase power, and the voltage MC of the C-phase power, wherein the voltages of the three phase powers are in different cycles.

In one embodiment, the starting position of the color wheel is a color wheel position corresponding to a case where the voltage of the A-phase power is 0V, the voltage of the B-phase power is 0V, and the C-phase power is at a high level.

DETAILED DESCRIPTION OF EMBODIMENTS

It should be understood that the specific embodiments described herein are only used to explain the present disclosure and are not intended to limit the present disclosure.

Figure 1:
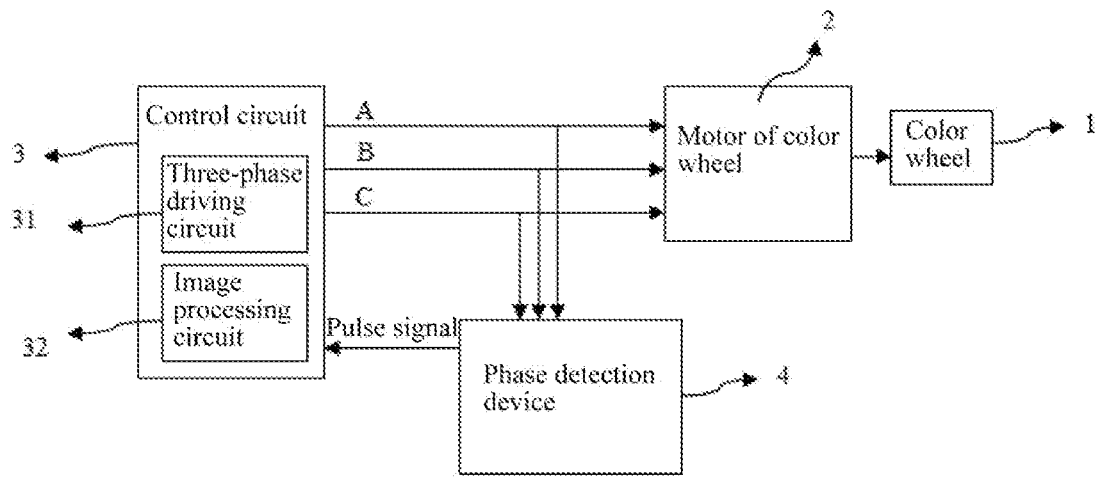
FIG. 1 is a structural schematic diagram of a color wheel phase detection system according to the present disclosure.

Referring to FIG. 1, the color wheel phase detection system of the present disclosure includes a color wheel 1, a motor 2 of the color wheel configured to drive the color wheel 1 to rotate, a control circuit 3, and a phase detection device 4.

The motor 2 of the color wheel is a three-phase motor. The control circuit 3 includes a three-phase driving circuit 31 for driving the motor 2 of the color wheel to operate and an image processing circuit 32. The three-phase driving circuit 31 generates an A-phase power, a B-phase power, and a C-phase power, which are respectively input to input terminals of the motor 2 of the color wheel and the phase detection device 4, to drive the motor 2 of the color wheel to work and in turn drive the color wheel to rotate. The image processing circuit 32 is configured to receive a signal sent by the phase detection device 4 and control the three-phase driving circuit according to the implemented signal, so as to control the projection image of the projection device according to the rotation speed and frequency of the motor of the color wheel.

Figure 2:
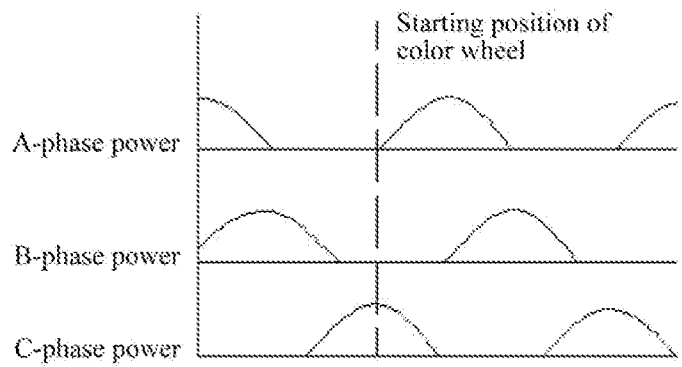
FIG. 2 is a schematic diagram of voltages of three phase powers corresponding to a three-phase driving circuit.

Correspondingly, the motor of the color wheel has a power of three phases A, B, and C, and when the motor operates, currents of the three phases in each cycle are: AB, AC, BC, BA, CA, CB, and corresponding voltages of the three phases, A, C, and B are MA, MB, and MC, respectively, as shown in FIG. 2 in detail. The phase detection device 4 is configured to detect the voltages MA, MB, and MC of the A-phase power, the B-phase power, and the C-phase power. The voltages of the three phase powers are in different cycles. The phases of the three phase powers at the current moment are determined according to the voltage values MA, MB, and MC of the A-phase power, the B-phase power, and the C-phase power, and the phase of the three-phase driving circuit at various moments is detected by the phase detection device, such that the phase detection device can determine the working state of the motor of the color wheel, and thus determine the position of the color wheel.

Figure 3:
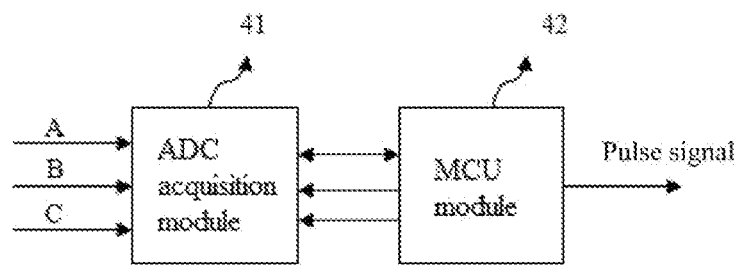
FIG. 3 is a structural schematic diagram of a phase detection device of a color wheel phase detection system according to the present disclosure.

Referring to FIG. 3, the phase detection device 4 includes an acquisition module for acquiring the phase of the three-phase driving circuit and a control module connected to the acquisition module. The control module is configured to control the acquisition module, receive and record an acquisition result of the acquisition module. Specifically, in this embodiment, an automatic data collection (ADC) acquisition module 41 and a Micro Control Unit (MCU) module 42 are provided. The ADC acquisition module is configured to detect and pick up the voltages MA, MB, and MC of the A-phase power, the B-phase power, and the C-phase power. Since the voltages of the three phase powers are in different cycles, the MCU module 42 can determine the phases of the three phase powers at the current moment according to the voltages MA, MB, and MC of the A-phase power, the B-phase power, and the C-phase power with reference to waveforms of the three phase powers shown in FIG. 2, and determine whether the phase is a preset phase.

A preset phase is set to determine a starting position of the color wheel 1. Specifically, in this embodiment, the voltage of the A-phase power is 0V, the voltage of the B-phase power is 0V, and the C-phase power is at a high level.

Referring to FIG. 2, a position of the dotted line is the set starting position, where the voltage of the A-phase power is 0V, the voltage of the B-phase power is 0V, and the C-phase power is at the high level. This state of the motor 2 of the color wheel occurs only at one point in each cycle, and the color wheel position corresponding to this point is set as the starting position of the color wheel. In other alternative embodiments, another phase may be set as the starting position, and it is applicable as long as it can function to calibrate the color wheel phase.

Figure 4:
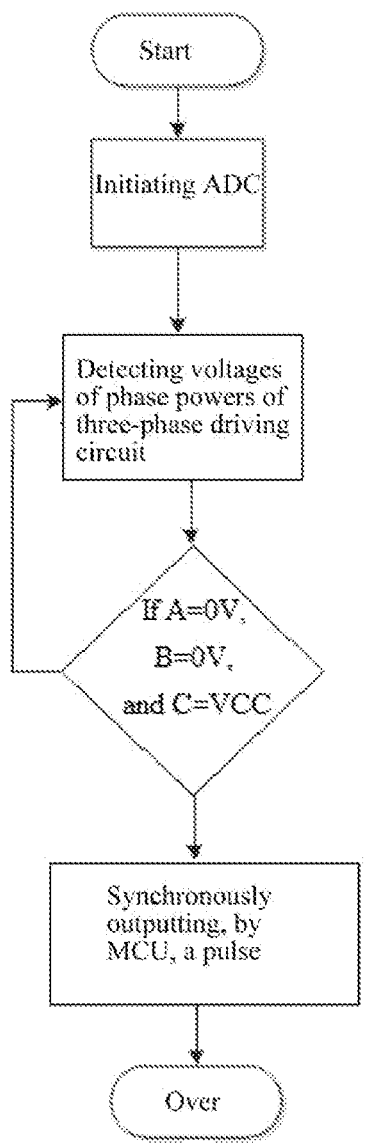
FIG. 4 is a detection flowchart of a color wheel phase detection system according to the present disclosure.

Referring to FIG. 4, a detection flowchart of a color wheel phase detection system according to the present disclosure is illustrated. The detection method of the color wheel phase detection system according to an embodiment of the present disclosure is conducted as follows. When the projection device starts to work, the ADC acquisition module is initialized, then detects the three-phase driving circuit and reads the voltage values of the three phase powers, A, B and C. When the preset phase is detected by the ADC acquisition module 41 of the phase detection device 4, that is, when it is detected that the voltage of the A-phase power is 0V, the voltage of the B-phase power is 0V, and the C-phase power is at the high level (VCC), the MCU module 42 will determine that the current phase matches the preset phase, generate one pulse signal and output it to the control circuit 3, specifically, to the image processing circuit 32. In this way, each time one pulse signal is detected, it can be known that the color wheel has been rotated to a starting position, thereby achieving detection of the phase of the color wheel.

Further, after the starting position of the color wheel is detected, the image processing circuit 32 can control the projection image of the projection device by the three-phase driving circuit through the rotation speed and frequency, etc. of the motor of the color wheel, to ensure that the image of the color wheel in each cycle is stable and consistent.

Unlike the case in the prior art, the beneficial effect of the present disclosure at least lies in that unlike the case in the prior art, the present disclosure provides a color wheel phase detection system, in which the color wheel is driven to rotate by the three-phase motor, and the phase detection device is used to detect the phase of the three-phase driving circuit so as to detect the phase of the color wheel, which avoids the phenomena of asynchronization of the projection image and blurred screen that are caused by sticking a tape on the color wheel, has good reliability, high accuracy, and low cost, and provides good user experience.

The above are merely exemplary embodiments of the present disclosure and the scope of the present disclosure is not limited thereto. Any equivalent structures or equivalent process transformations made using the description and drawings of the present disclosure, or direct or indirect applications in other related technical fields are included in the protection scope of the present disclosure.

What is claimed is:

1. A color wheel phase detection system, comprising:
a color wheel;
a motor of the color wheel being a three-phase motor and configured to drive the color wheel to rotate;
a control circuit comprising a three-phase driving circuit for controlling operation of the motor of the color wheel; and
a phase detection device for detecting the three-phase driving circuit, wherein the phase detection device sends a pulse signal to the control circuit when a preset phase corresponding to a preset starting position of the color wheel is detected, so as to achieve detection of a phase of the color wheel.

2. The color wheel phase detection system according to claim 1, wherein the phase detection device comprises:
  an acquisition module for acquiring a phase of the three-phase driving circuit; and
  a control module connected to the acquisition module and configured to control the acquisition module and to receive and record an acquisition result of the acquisition module.

3. The color wheel phase detection system according to claim 2, wherein the acquisition module is an ADC acquisition module.

4. The color wheel phase detection system according to claim 3, wherein the three-phase driving circuit comprises an A-phase power, a B-phase power, and a C-phase power, and the ADC acquisition module is configured to detect voltages of the A-phase power, the B-phase power, and the C-phase power simultaneously.

5. The color wheel phase detection system according to claim 4, wherein the preset phase is a phase where the voltage of the A-phase power is 0 V, the voltage of the B-phase power is 0V, and the C-phase power is at a high level.

6. The color wheel phase detection system according to claim 2, wherein the control module is an MCU module.

7. The color wheel phase detection system according to claim 1, wherein the control circuit further comprises an image processing circuit which is configured to receive the pulse signal sent by the phase detection device and control the three-phase driving circuit based on the pulse signal.

8. A projection device, comprising a color wheel phase detection system comprising:
  a color wheel;
  a motor of the color wheel being a three-phase motor and configured to drive the color wheel to rotate;
  a control circuit comprising a three-phase driving circuit for controlling operation of the motor of the color wheel; and
  a phase detection device for detecting the three-phase driving circuit, wherein the phase detection device sends a pulse signal to the control circuit when a preset phase corresponding to a preset starting position of the color wheel is detected, so as to achieve detection of a phase of the color wheel.

9. The projection device according to 8, wherein the phase detection device comprises:
  an acquisition module for acquiring a phase of the three-phase driving circuit; and
  a control module connected to the acquisition module and configured to control the acquisition module and to receive and record an acquisition result of the acquisition module.

10. The projection device according to 9, wherein the acquisition module is an ADC acquisition module.

11. The projection device according to 10, wherein the three-phase driving circuit comprises an A-phase power, a B-phase power, and a C-phase power, and the ADC acquisition module is configured to detect voltages of the A-phase power, the B-phase power, and the C-phase power simultaneously.

12. The projection device according to 16, wherein the preset phase is a phase where the voltage of the A-phase power is 0 V, the voltage of the B-phase power is 0V, and the C-phase power is at a high level.

13. The projection device according to 9, wherein the control module is an MCU module.

14. The projection device according to 8, wherein the control circuit further comprises an image processing circuit which is configured to receive the pulse signal sent by the phase detection device and control the three-phase driving circuit based on the pulse signal.

15. A method of detecting a phase of a color wheel using a color wheel phase detection system, the color wheel having a preset starting position the color wheel phase detection system comprising:
  a color wheel;
  a motor of the color wheel being a three-phase motor and configured to drive the color wheel to rotate;
  a control circuit comprising a three-phase driving circuit for controlling operation of the motor of the color wheel; and
  a phase detection device for detecting the three-phase driving circuit, wherein the phase detection device sends a pulse signal to the control circuit when a preset phase corresponding to a preset starting position of the color wheel is detected, so as to achieve detection of a phase of the color wheel,
  wherein the method comprises steps of:
  detecting, by the phase detection device, a phase of the three-phase driving circuit at various moments, and determining whether the phase is a preset phase corresponding to the preset starting position of the color wheel; and
  sending, by the phase detection device, a pulse signal when the phase detection device detects that a phase of the three-phase driving circuit is the preset phase.

16. The method according to claim 15, wherein said detecting, by the phase detection device, a phase of the three-phase driving circuit comprises steps of:
  acquiring, by an ADC module, a voltage MA of an A-phase power, a voltage MB of a B-phase power, and a voltage MC of a C-phase power; and
  determining phases of the three phase powers at a current moment according to the voltage MA of the A-phase power, the voltage MB of the B-phase power, and the voltage MC of the C-phase power, wherein the voltages of the three phase powers are in different cycles.

17. The method according to claim 15, wherein the starting position of the color wheel is a color wheel position corresponding to a case where the voltage of the A-phase power is 0V, the voltage of the B-phase power is 0V, and the C-phase power is at a high level.

18. The method according to claim 15, wherein the control circuit further comprises an image processing circuit,
  wherein the method further comprises:
  receiving, by the image processing circuit, the pulse signal sent by the phase detection device, and controlling, by the image processing circuit, the three-phase driving circuit based on the pulse signal.

* * * * *